UNITED STATES PATENT OFFICE.

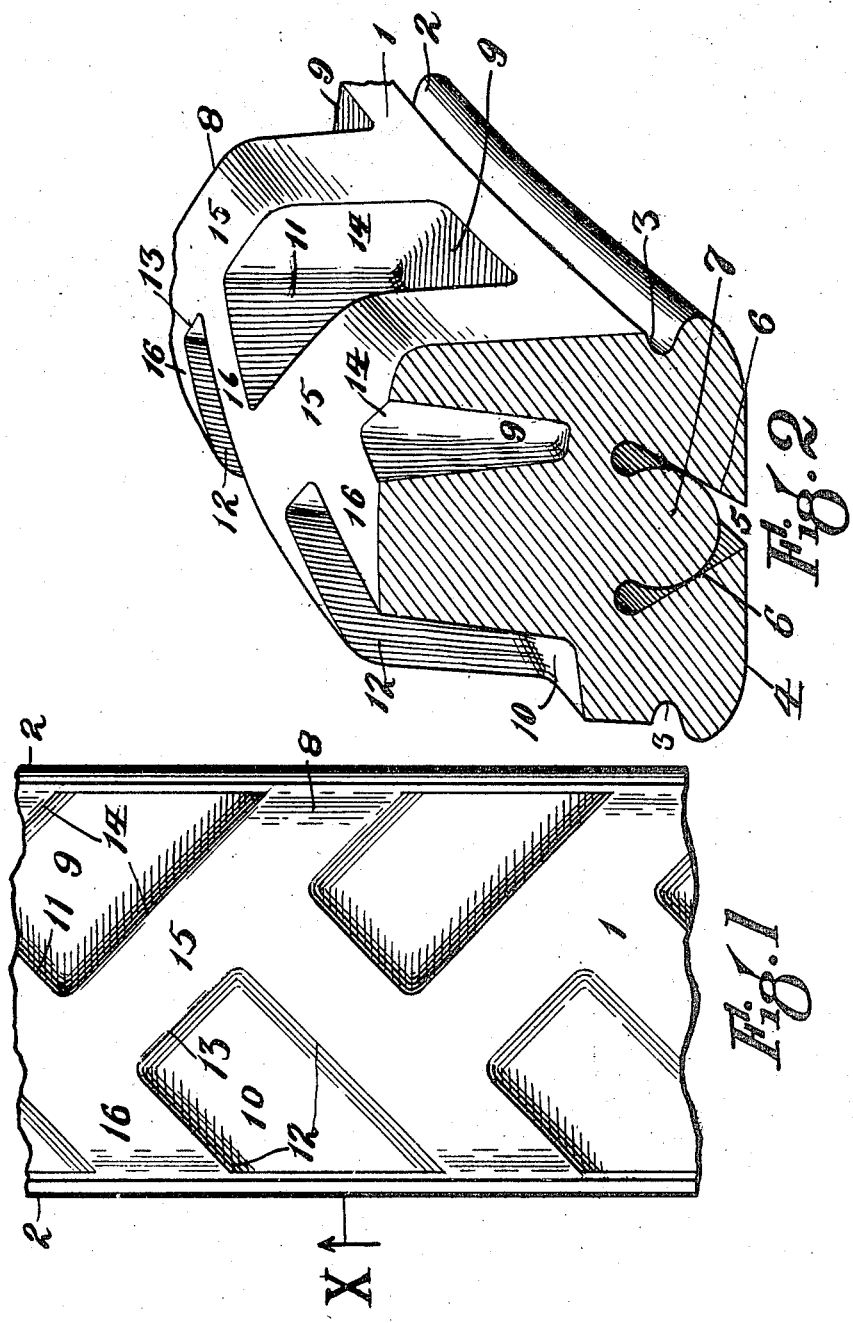

HARRY E. BOYD, OF AKRON, OHIO.

ELASTIC VEHICLE-TIRE.

1,208,902. Specification of Letters Patent. Patented Dec. 19, 1916.

Application filed January 31, 1916. Serial No. 75,340.

*To all whom it may concern:*

Be it known that I, HARRY E. BOYD, a citizen of the United States, residing at Akron, in the county of Summit and State of Ohio, have invented new and useful Improvements in Elastic Vehicle-Tires, of which the following is a specification.

This invention relates to improvements in elastic vehicle tires.

The object of the invention is to provide an elastic vehicle tire provided with improved means for increasing the tractive properties of the tire and to decrease the liability of the vehicle wheel slipping or skidding when a tire is employed.

A further object of the invention is to increase the resiliency of the tire and so construct the same that the engagement of the tire with the rim is increased proportionably to the degree of distortion it undergoes under a load.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a plan view of a portion of the tread of a tire embodying this invention; and, Fig. 2, is a view partly in transverse section and partly in perspective of the tire shown in Fig. 1.

The tire which forms the subject matter of this invention comprises a body portion 1 of a vulcanizable gum compound, such as rubber, provided at the inner lateral parts with projecting circumferential beads 2 adjacent outside of which are circumferential grooves 3 to receive the inturned edges of a clencher tire rim. The beads 2 are adapted to seat in the grooves in the clencher rim in the ordinary manner. Centrally of the base or inner portion 4 of the tire is a circumferentially-extending groove or channel 5 the lateral walls 6 of which are outwardly-inclined and furthermore are inclined away from each other so that the channel itself is substantially in the form of a frustum of a pyramid in cross section. The outer wall of the groove is provided with an inwardly-extending cylindrical rib 7 integral with the outer wall, and of a sufficient transverse width to engage the walls 6 of the groove 5 when the tire is distorted by a load applied to the tread thereof. The rib 7 constitutes a wedge member for forcing the beads 2 laterally in opposite directions to cause them to anchor themselves in the grooves of the clencher tire rim by which the tire is secured on a vehicle wheel. In the tread 8 of the tire are two series of notches or recesses 9 and 10. These recesses are preferably extended inwardly substantially half the radial thickness of the tire and the lateral walls of each recess are in parallelism and with the end walls 11 of the recesses 9 in parallelism with the walls 12 of the recesses 10 and with the end walls 13 of the recesses 10 parallel with the side walls 14 of the recesses 9. Furthermore, the end wall 13 of each recess 10 is in oblique alinement with one of the walls of one of the recesses 9 on the opposite side of the tire, and the end wall of each recess 9 in oblique alinement with one wall 12 of one of the recesses 10.

The recesses 9 are arranged in a circumferential series on one side of the tread of the tire and are spaced from each other to provide obliquely-positioned ribs 15 between them and the recesses 10 on the opposite side of the tread are arranged in a series throughout the circumference of the tread and on the other side and are separated from each other to provide diagonal or oblique ribs 16 between them. The various ribs 15 and 16 are integral with each other and are furthermore integral with the body 1 of the tire. The closed ends of the recesses extend laterally inwardly toward each other and the center of the tire and their innermost portions extend past the longitudinal central line of the same so that by this arrangement the road-engaging face of the tire is provided with a series of diagonally-extending ribs all formed integral and with ribs on one side connecting with the ribs on the opposite side of the tread at right angles, as clearly shown in Fig. 1. By this arrangement the amount of material in the tire is reduced thereby rendering the same more resilient and the projecting ribs in connection with the diagonally-disposed recesses afford a plurality of projections for engagement with the road bed for increasing the tractive properties of the tire and in preventing skidding of the wheel on which the same is employed. As already stated, as the load increases on the tread of the tire it tends to force the circumferential rib 7 inwardly toward the rim causing the separated bead-carrying portions 2 of the base of the tire laterally into better engagement with the clencher rim flanges on which the tire is mounted.

I claim:—

An elastic tire provided at the inner lateral portions with rim-engaging members and further provided centrally of the inner face with a circumferentially-extending groove, the side walls of which constitute the inner faces of the rim-engaging members and are inclined outwardly from each other, and a rib integral with the outer wall of said groove, said rib having a rounded inner face and rounded sides, the rounded sides contacting with the inner faces of the rim-engaging members substantially midway the width of said faces, the rounded inner face of the rib and sides beyond the points of contact with the faces of the rim engaging members being free from engagement with the said members, the expansion of the rib at the points of contact with the rim-engaging members due to compression of the tire causing the rim-engaging members to be forced into firm engagement with a rim flange.

In testimony whereof I have hereunto set my hand.

HARRY E. BOYD.